March 10, 1970  J. E. RAIDEL  3,499,660
TANDEM TRUCK SUSPENSION
Filed Sept. 11, 1967  2 Sheets-Sheet 1
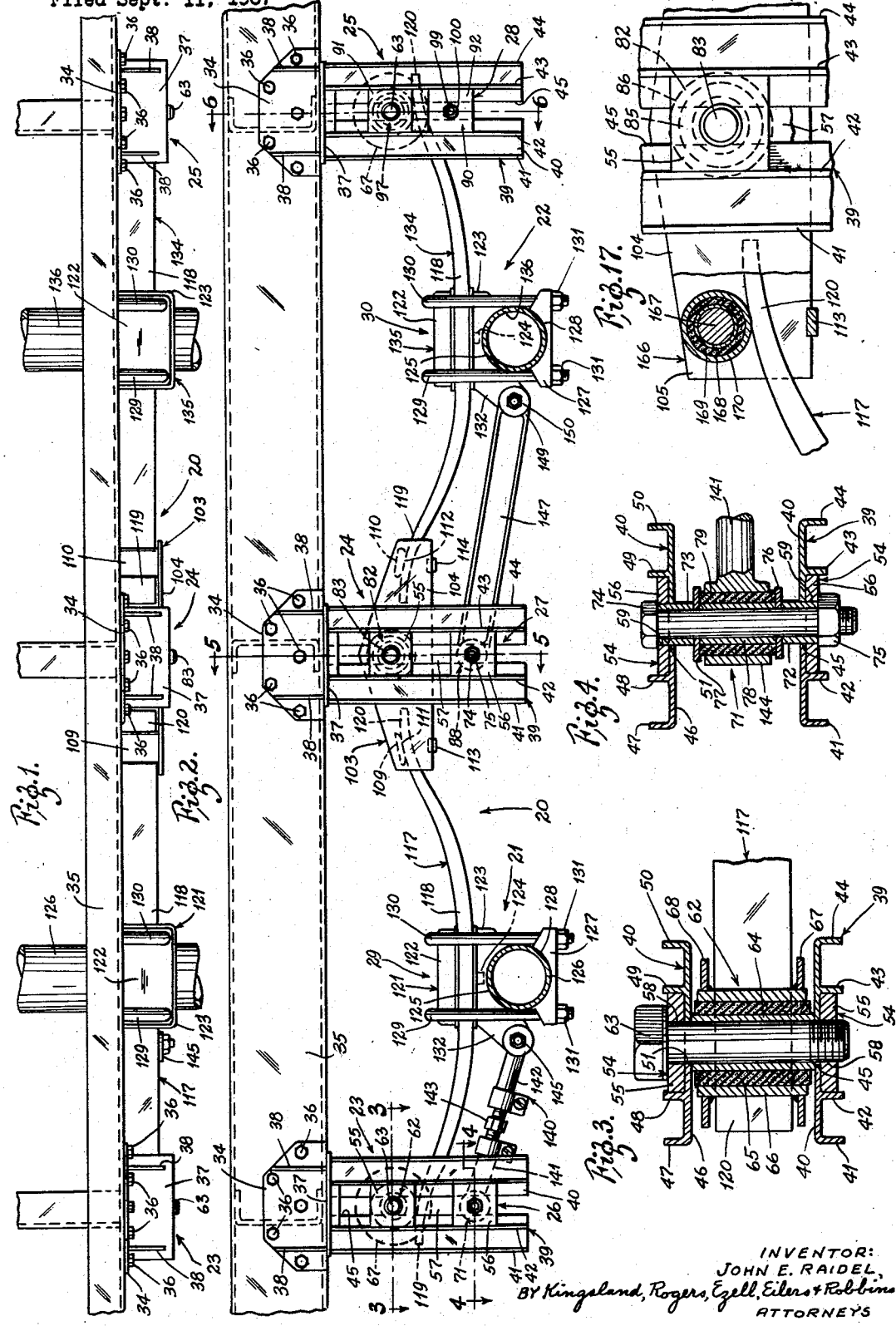
INVENTOR:
JOHN E. RAIDEL,
BY Kingsland, Rogers, Ezell, Eilers + Robbins
ATTORNEYS

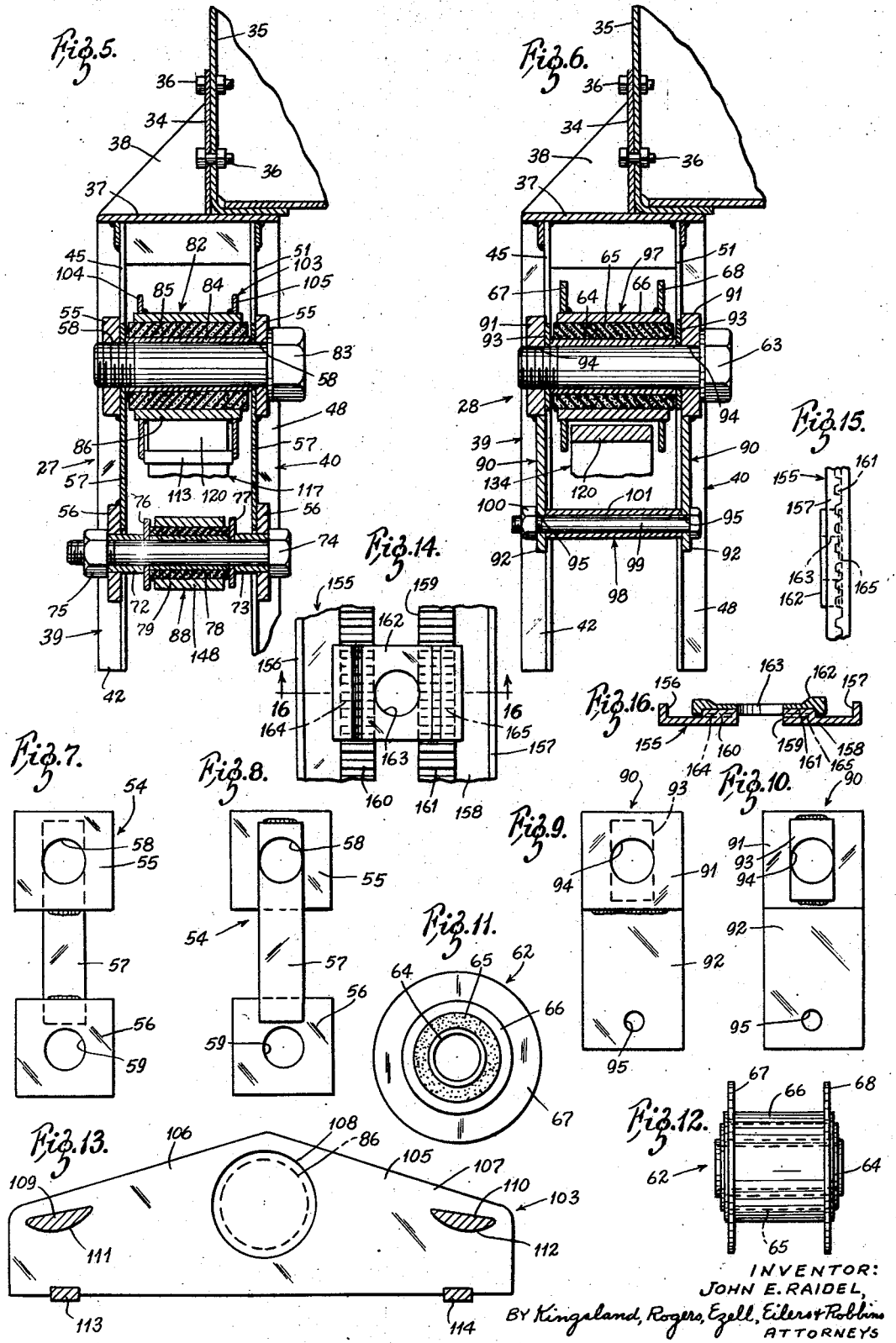

United States Patent Office 3,499,660
Patented Mar. 10, 1970

3,499,660
TANDEM TRUCK SUSPENSION
John E. Raidel, Rte. 9, Box 400–M,
Springfield, Mo. 65801
Filed Sept. 11, 1967, Ser. No. 666,827
Int. Cl. B60g 11/02, 17/02
U.S. Cl. 280—104.5                        8 Claims

ABSTRACT OF THE DISCLOSURE

An adjustable vehicle suspension assembly for variable axle mounting height selections. Vertically adjustable hanger assemblies provide for vertical adjustment of bearings against which the leaf springs of the suspension assemblies bear and provide for vertical adjustment of mounts to which radius rods are connected. These adjustments permit this suspension to accommodate any given axle mounting height application. Furthermore, the height adjustments can be reset any required number of turns. Hanger assemblies at front, rear and intermediate locations are interchangeable. The leaf springs and radius rods are joined to a central axle connector assembly, each axle connector assembly being mounted to a vehicle axle. A central bearing between two suspension assemblies, which is also vertically adjustable, supports an equalizer that oscillates to equalize loads between two axles. With the height adjustments permitted by this suspension, no replacements or alterations in axle connector assemblies or components, radius rods, leaf springs, equalizers, or other components are required. Thus the same basic components are used for any axle mounting height application.

BRIEF DESCRIPTION OF THE INVENTION

This adjustable suspension assembly comprises front and rear suspension assemblies, each of which includes an axle connector assembly connected to an axle of the vehicle. The central portion of a leaf spring is clamped to the axle connector assembly, and an end of a radius rod is rotatably journaled to the axle connector assembly. The ends of the leaf spring bear against bearings which are journaled in clamping plate assemblies. The other end of the radius rod is also mounted on a bushing that is journaled in a clamping plate assembly. The clamping plate assemblies are vertically adjustable in hanger supports and can be locked in place in any selected vertical position, depending upon the vertical position of the axle.

In a modified form of the invention, a positive locking tooth arrangement between the clamping plates and the hanger supports is provided.

The central hanger assembly between the front and rear suspension assemblies carries an equalizer that oscillates about a bearing. The adjacent ends of the springs bear against opposed bearing pads or bushings carried by the equalizer. The equalizer can oscillate for equalization of loads between the two vehicle axles. The radius rod for one of the suspension assemblies is adjustable in length. This permits accurate alignment of the axles.

DESCRIPTION OF THE DRAWINGS

FIGURE 1 is a top plan view of the adjustable vehicle suspension assembly;

FIGURE 2 is a side elevation view of the adjustable vehicle suspension assembly;

FIGURE 3 is an enlarged view in section taken along the line 3—3 of FIGURE 2;

FIGURE 4 is an enlarged view in section taken along the line 4—4 of FIGURE 2;

FIGURE 5 is an enlarged view in section taken along the line 5—5 of FIGURE 2;

FIGURE 6 is an enlarged view in section taken along the line 6—6 of FIGURE 2;

FIGURE 7 is an enlarged side elevation view of the clamping plate assembly used with the end hanger assembly;

FIGURE 8 is a side elevation view of the clamping plate assembly of FIGURE 7 as viewed from the rear of FIGURE 7;

FIGURE 9 is a side elevation view of a clamping plate assembly used with the equalizer hanger assembly;

FIGURE 10 is a side elevation view of the clamping plate assembly of FIGURE 9 as viewed from the rear thereof;

FIGURE 11 is an enlarged end elevation view of the bearing assembly;

FIGURE 12 is an enlarged side elevation view of the bearing assembly;

FIGURE 13 is an enlarged side elevation view of the equalizer beam with the wear pads and retainer lugs shown in section;

FIGURE 14 is a fragmentary side elevation view of a modified form of locking arrangement between the clamping plate assembly and the hanger assembly;

FIGURE 15 is a fragmentary end elevation view of the locking arrangement of FIGURE 14;

FIGURE 16 is a view in section taken along the line 16—16 of FIGURE 14; and

FIGURE 17 is a fragmentary, partially sectioned side elevation view of a modified form of compensator.

DETAILED DESCRIPTION OF THE INVENTION

In the embodiment illustrated, the suspension assembly 20 comprises two suspensions 21 and 22 which are, in many components, identical. In the suspension assembly 20, there is a front hanger support 23, a central equalizer hanger support 24, and a rear hanger support 25. A bearing and radius rod mount assembly 26 is adjustably locked to the front hanger assembly 23, a bearing and radius rod mount assembly 27 is adjustably joined to the equalizer hanger support 24, and a bearing and spring stop assembly 28 is adjustably fastened to the rear hanger support 25. Between the front and equalizer hanger supports 23 and 24, there is a front spring and radius rod assembly 29. Between the equalizer and rear hanger supports 24 and 25, there is a rear spring and radius rod assembly 30. These are the general components of the suspension assembly 20 which will now be described in more detail.

The hanger supports 23, 24, and 25 may be identical. Each includes a mounting bracket 34 fastened to the vehicle chassis 35 by a plurality of bolts 36. The bracket 34 includes a horizontal plate member 37 and reinforcing gussets 38.

Outside and inside rails 39 and 40, respectively, are welded to the horizontal plate 37. The outside rail 39 comprises a face plate 40 with outwardly extending vertical webs 41, 42, 43, and 44 and a central vertical slot 45. The inside rail 40 also has a face plate 46 with inwardly extending vertical rails 47, 48, 49, and 50 and a central vertical slot 51.

The bearing and radius rod mount assemblies 26 and 27 may also be identical, with each comprising identical inside and outside clamping plate assemblies 54 illustrated in FIGURES 7 and 8. The clamping plate assemblies 54 comprise upper and lower blocks 55 and 56 which are wider than the slot 45 and 51 in the hangers 39 and 40 and which fit between the webs 42 and 43 and the webs 48 and 49. The narrower plate 57 is welded to the backs of the blocks 55 and 56. The width of the plates 57 is such as to permit them to slide within the slots 45 and 51 of the hangers 39 and 40. There is a hole 58 extending through the block 55 and the upper end of the plate 57. Also, there is a hole 59 extending through the block 56.

As shown particularly in FIGURE 3, a front bearing 62 is mounted between the outside and inside blocks 55. The front bearing comprises a bolt 63 that extends through the hole 58 and is threaded into the opposite hole 58, the bolt 63 also extending through the slots 45 and 51. A metal sleeve 64 surrounds the shank of the bolt 63. A rubber bushing 65 is bonded to the sleeve 64, and another metal sleeve 66 is bonded to the outer surface of the bushing 65. A pair of washers 67 and 68 is welded to the sleeve 66.

A radius rod support bearing 71 is mounted between the lower blocks 56 of the inside and outside clamping plate assemblies 54. As shown in FIGURE 4, the radius rod support bearing comprises a pair of sleeves 72 and 73 welded to the inner walls of the holes 58 and 59. A bolt 74 extends through the sleeves 72 and 73 and is held in place by a nut 75. There is a pair of washers 76 and 77 between which another metal sleeve 78 is positioned on the bolt 74. A rubber bushing 79 is bonded to the metal sleeve 78 and is also positoined between the washers 76 and 77.

Referring to the bearing and radius rod mount assembly 27 connected to the equalizer hanger support 24, there is a bearing 82 similar to the bearing 62 mounted between the inside and outside block 55, as shown in FIGURE 5. The bearing 82 comprises a bolt 83 extending through the hole 58 in the inside block 55 and threaded into the hole 58 in the outside block 55. A metal sleeve 84 surrounds the bolt 83, a rubber bushing 85 is bonded to the sleeve 84, and another metal sleeve 86 is bonded to the rubber bushing 85. Thus the bearing 82 is similar to the bearing 62 except that it does not have the washers 67 and 68.

A radius rod support bearing 88 is mounted between the blocks 56 below the bearing 82, as shown in FIGURE 5. Since the radius rod support bearing 88 may be identical to the radius rod support bearing 71 shown in FIGURE 4, it need not be further described, and the identical parts have been given identical reference characters.

Referring to the bearing and spring stop assembly 28, it comprises identical inner and outer clamping plate assemblies 90, illustrated in FIGURES 9 and 10. Each clamping plate assembly 90 comprises an upper block 91 with a thinner lower plate 92 welded to its lower edge and a narrower plate 93 welded to its rear side. There is a hole 94 through the block 91 and narrow plate 93, and a hole 95 extends through the thinner lower plate 92. The block 91 and plate 92 are wider than the slots 45 and 51, whereas the narrower plate 93 is slidable within the slots 45 and 51.

As shown in FIGURE 6, a bearing 97 is mounted between the blocks 91. Since the bearing 97 may be identical to the bearing 62 shown in FIGURE 3, it is not further described, but has been given identical reference characters for its components.

A spring stop 98 is mounted between the lower thin plates 92. The spring stop 98 comprises a bolt 99 extending through the holes 95 and held in place by a nut 100. A sleeve 101 surrounds the bolt 99.

Referring to FIGURES 2, 5, and 13, an equalizer 103 is mounted on the bearing 82. The equalizer 103 comprises opposed equalizer beams 104 and 105 having arms 106 and 107 as illustrated in FIGURE 13. There is a central hole 108 through each beam 104 and 105 by which the beams are mounted on the metal sleeve 86 and welded thereto. Forward and rearward metal bearing pads 109 and 110 extend between and are welded to the beams 104 and 105. The bearing pads 109 and 110 have convex lower surfaces 111 and 112, respectively.

Spaced below the bearing pads 109 and 110, a pair of lug blocks 113 and 114 are positioned between and welded to the equalizer beams 104 and 105.

The forward spring and radius rod assembly 29 comprises a leaf spring 117 having a central downwardly bowed section 118 with reversely bent ends 119 and 120 adapted to bear against the bearing 62 and the bearing block 109, respectively.

An axle connecting assembly 121 is mounted to the central section 118 of the spring 117. The axle connecting assembly comprises an upper plate 122 bearing against the upper surface of the spring 117 and a lower block 123 bearing against the lower surface of the spring 117. A lug 124 is welded to the lower surface of the spring 117 and extends into a complementary shaped recess in the lower block 123. The lower block 123 has an arcuate recess 125 in its lower side that bears against the upper surface of the vehicle axle 126. A spring seat block 127 is mounted below the axle 126 and has an arcuate recess 128 in its upper side that bears against the lower side of the axle 126. The plate 122, block 123, and spring seat block 127 are held assembled by a pair of U bolts 129 and 130 fastened tightly by nuts 131. The lower block 123 has a forwardly extending lug 132.

The rear spring and radius rod assembly 30 includes a spring 134 that is identical to the spring 117 and an axle connector assembly 135 that is identical to the axle connector assembly 121. Hence these components will not be redescribed and their identical parts are given identical reference characters to those in the front spring and radius rod assembly 29. The axle connector assembly 135 is mounted on the rear vehicle axle 136.

The front spring and radius rod assembly 29 has an adjustable radius rod 140 comprising front and rear arms 141 and 142 joined by a double ended stud 143. As shown in FIGURE 4, the front arm 141 has a looped end 144 surrounding the rubber bushing 79. The rear arm 142 is fastened by a suitable conventional rotary bearing 145 to the lug 132 on the axle connector assembly 121. As is known in the art, rotation of the double ended stud 143 adjusts the overall length of the radius rod 140.

The rear axle and radius rod assembly 30 has a fixed length radius rod 147. As shown in FIGURE 5, the radius rod 147 has a looped end 148 surrounding the rubber bushing 79. The rear end 149 of the radius rod 147 is connected by a conventional rotary bushing or bearing 150 to the lug 132.

The clamping plate assemblies 54 and 90 can be adjusted in height relative to the hangers and then welded and tightened in place, as will be more fully described. FIGURES 14, 15, and 16 illustrate a modification wherein the hangers 155 have outer vertical webs 156 and 157 and a face plate 158 with a central vertical slot 159. On each side of the slot 159, the face plate 158 has vertical rows of teeth 160 and 161. A block 162 which, for illustrative purposes in FIGURES 14–16, corresponds to any of the blocks 55, 56, or 91 as well as the plates 92, with a corresponding central hole 163, has two rows of teeth 164 and 165 complementary to the rows of teeth 160 and 161. Thus, it is evident that when any of the bolts, such as a bolt corresponding to the bolt 63 illustrated in FIGURE 3, is loosened, the vertical position of the block 62, and therefore the bearings, radius rod support bearings, and/or axle stops which it supports can be adjusted. Subsequent tightening of the bolt locks the block 162 in the adjusted position.

FIGURE 17 illustrates a modified form of equalizer beam 166 wherein parts which are common to the equalizer beam 103 have been given similar reference characters. In the equalizer beam 166, bushings have been substituted for the bearing pads 109 and 110. Each bushing comprises a central shaft 167 welded between the equalizer bears 104 and 105. A metal sleeve 168 surrounds the shaft 167. A rubber bushing 169 is bonded to the sleeve 168, and an outer metal sleeve 170 is bonded to the bushing 169. The end 120 of the spring 117 bears against the forward bushing 165, and the end 119 of the spring 134 bears against the rearward bushing 165 (not shown).

OPERATION

Although front and rear suspension assemblies 21 and 22 are illustrated and described, for a one-axle installation, only a single suspension assembly like the front suspension assembly 21 would be used. In that event, the rear hanger assembly 25 would be used in place of the equalizer hanger assembly 24.

With the two suspension assemblies 21 and 22, the equalizer 103 causes them to work together for even distribution of loads. For example, upwardly applied forces against the front axle 126 are dampened by the spring 117 which flexes upwardly and applies pressure against the bearing 62 and the bearing pad 109. Pressure against the bearing pad 109 causes the equalizer 103 to oscillate about the bearing 82, causing the bearing pad 110 to apply downward pressure against the end 119 of the spring 134. The latter pressure is resisted by the spring 134, and in this manner, the shock forces applied to the front axle 126 are absorbed by both the springs 117 and 134.

The upward flexing of the spring 117 produces the dampening of the shock forces. As the spring flexes upwardly, its ends 119 and 120 are free to slide forwardly and rearwardly against the bearing 62 and the bearing pad 109. The radius rod 140 controls the position of the axle 126 and prevents it from rotating.

The invention provides great flexibility in installation of the suspension assemblies 21 and 22. Vertical adjustment for variations in axle height is provided by the hanger assemblies 23, 24, and 25. In the installation, the height of the axles 126 and 136 is first determined. To accommodate these axle heights, the vertical positions of the assemblies 26, 27, and 28 are adjusted relative to the respective hangers for the different blocks 55 and 56, and the block and plate combinations 91 and 92 are tack welded and the several bolts 63, 74, 83, and 99 are tightened. To change these adjusted positions, the blocks 55 and 56 and the block and plate combinations 91 and 92 are broken free of their tack welds, and the several bolts are again loosened.

Axle alignment is provided by the adjustable radius rods 140. Since the radius rods 147 are not adjustable, the orientation of the axle 136 is fixed. The axle 126 can be readily aligned with the axle 136 by adjustment of the radius rods 140.

In the modification of FIGURES 14–16, a convenient lock arrangement is provided. The lock arrangement of FIGURES 14–16 eliminates the need for tack welding of the blocks 55 and 56 and the block and plate combinations 91 and 92, and also provides a positive lock for any vertical adjustment positions of the various bearings.

Various changes and modifications may be made within the purview of this invention as will be readily apparent to those skilled in the art. Such changes and modifications are within the scope and teaching of this invention as defined by the claims appended hereto.

What is claimed is:

1. A vehicle suspension assembly comprising first and second hangers adapted to be suspended from a vehicle chassis, a first bearing, a vertically slideable connection for connecting the first bearing to the first hanger, a second bearing, a vertically slideable connection for connecting the second bearing to the second hanger, means to adjust the vertical position of each bearing relative to its hanger according to the height of the vehicle axle, means for locking the bearing in its vertically adjusted position, a leaf spring having ends bearing against the lower sides of the bearings, means connecting the central portion of the leaf spring to the said vehicle axle, a radius rod having an end rotatably connected to the axle connecting means, and means for connecting the other end of the radius rod to a vertically adjustable position on one of the hangers.

2. The combination of claim 1 wherein the radius rod includes means for adjusting its overall length for alignment of the axle.

3. A vehicle suspension assembly comprising first and second hangers adapted to be suspended from a vehicle chassis, a first bearing supported by the first hanger, a second bearing supported by the second hanger, means to adjust the vertical position of each bearing relative to its hanger, means for locking the bearing in its vertically adjusted position, a leaf spring having ends bearing against the lower sides of the bearings, means connecting the central portion of the leaf spring to a vehicle axle, a radius rod having an end rotatably connected to the axle connecting means, means for connecting the other end of the radius rod to a vertically adjustable position on one of the hangers, the means to lock the bearing in position comprising a toothed block to which the bearing is connected interengageable with complementary teeth on the hanger, and means to releasably hold the teeth of the block in engagement with the teeth of the hanger.

4. A vehicle suspension assembly comprising first and second hangers adapted to be suspended from a vehicle chassis, a first bearing supported by the first hanger, a second bearing supported by the second hanger, means to adjust the vertical position of each bearing relative to its hanger, means for locking the bearing in its vertically adjusted position, a leaf spring having ends bearing against the lower sides of the bearings, means connecting the central portion of the leaf spring to a vehicle axle, a radius rod having an end rotatably connected to the axle connecting means, means for connecting the other end of the radius rod to a vertically adjustable position on one of the hangers, a second spring assembly, a third hanger, a third bearing, means to connect the third bearing to the third hanger in a vertically adjustable position, an equalizer support bearing, an equalizer supported on the equalizer support bearing, the equalizer support bearing being vertically adjustable relative to the second hanger, the second bearing being mounted on one end of the equalizer, a fourth bearing mounted on the other end of the equalizer with the equalizer support bearing between the second and fourth bearings, the second suspension assembly including a second leaf spring having ends bearing against the lower sides of the third and fourth bearings, means to connect a central portion of the second leaf spring to another axle of the vehicle, a second radius rod, means to connect one end of the second radius rod to the last-named axle connecting means, and means to connect the other end of the radius rod in vertically adjustable position to the second hanger.

5. The combination of claim 4 wherein the second radius rod is of fixed length.

6. The combination of claim 4 including a spring stop, means to connect the spring stop to the third hanger in vertically adjustable position below the third bearing, the end of the spring which bears against the third bearing being positioned above the spring stop, whereby the spring stop restricts downward movement of the said end of the second spring, and lugs vertically spaced below the second and fourth bearings and connected to the equalizer for restricting downward movement of the adjacent ends of the springs.

7. The vehicle suspension assembly of claim 4 wherein the second and fourth bearings comprise metal bearing pads affixed to the equalizer.

8. The vehicle suspension assembly of claim 4 wherein the equalizer comprises a pair of spaced parallel plates, the second and fourth bearings each comprising a shaft mounted between the two plates, an inner sleeve mounted on the shaft, an elastomeric bushing surrounding and bonded to the inner sleeve, and an outer sleeve surrounding and bonded to the bushing.

References Cited

UNITED STATES PATENTS

| | | | |
|---|---|---|---|
| 2,626,144 | 1/1953 | Stephen | 280—124 X |
| 2,988,352 | 6/1961 | Masser | 280—124 X |

PHILIP GOODMAN, Primary Examiner

U.S. Cl. X.R.

267—56; 280—124